United States Patent [19]

Nguyen

[11] Patent Number: 4,502,781
[45] Date of Patent: Mar. 5, 1985

[54] FLASH CONTACT PRINTER

[76] Inventor: Tan V. Nguyen, 4425 Arch St., San Diego, Calif. 92116

[21] Appl. No.: 492,182

[22] Filed: May 2, 1983

[51] Int. Cl.³ .............................................. G03B 27/02
[52] U.S. Cl. ...................................... 355/79; 355/115
[58] Field of Search ..................... 355/79, 112, 40, 39, 355/80, 113-121; 354/105; 362/191, 192, 3-11

[56] References Cited

U.S. PATENT DOCUMENTS

| 2,420,141 | 5/1947 | Lessler | 355/80 |
| 4,079,243 | 3/1978 | Pemberton | 362/191 |
| 4,193,684 | 3/1980 | Armstrong | 355/40 |

Primary Examiner—L. T. Hix
Assistant Examiner—Della J. Rutledge
Attorney, Agent, or Firm—Baker, Maxham, Callan & Jester

[57] ABSTRACT

A contact printer for printing on photographic paper includes a generally pyramid-shaped lower housing having an exposure window with a transparent cover held by a generally rectangular peripheral frame for holding the transparent cover and a print mask over the exposure window with a light positioned at the apex of the lower housing and an upper housing encompassing the apex of the lower housing forming a chamber in which is disposed batteries and light control circuitry with an exposure activating switch and a light indicator positioned on top of the upper housing.

14 Claims, 4 Drawing Figures

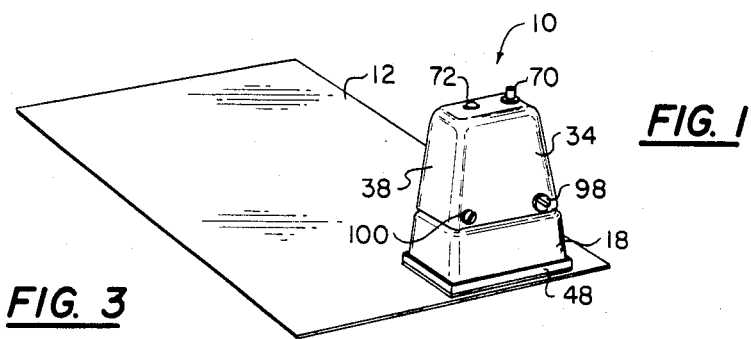
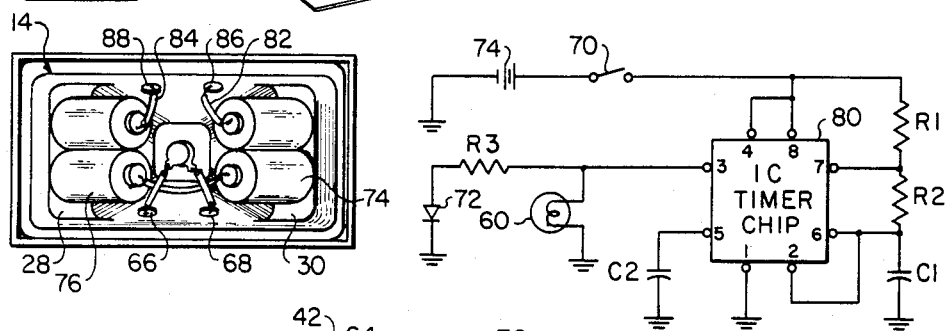
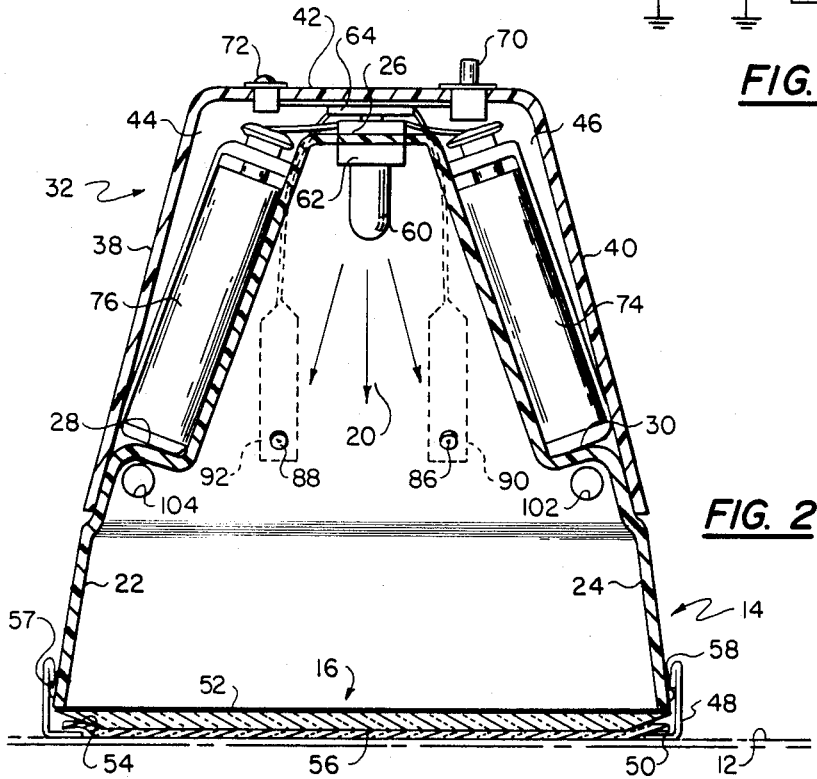

FLASH CONTACT PRINTER

BACKGROUND OF THE INVENTION

The present invention relates to photoprinting and pertains particularly to an improved contact photoprinter.

It is frequently desirable when making photographs and other photographic records to record additional information such as identifying information, marks, symbols, notices and the like on the photographic record. It is particularly desirable that such printing be accomplished independently of the primary printing procedures. For this reason, it is desirable that a small printing device be available which is capable of printing information and the like onto small surface areas such as the corners or edges of photographically printed materials.

It is therefore desirable that a miniature independent printer be available for darkroom use for printing information and the like on photographic medium.

SUMMARY AND OBJECTS OF THE INVENTION

It is the primary object of the present invention to provide an improved contact printer.

In accordance with the primary aspect of the present invention, a generally pyramid-shaped housing has an exposure opening formed at the base thereof with a light source mounted at the apex with a print holder for holding a transparent cover and a contact print over the exposure window and including a timer control circuit for activating the light source for projecting light through the contact print onto a synthesized medium.

BRIEF DESCRIPTION OF THE DRAWINGS

The above and other objects and advantages of the present invention will become apparent from the following description when read in conjunction with the drawings wherein:

FIG. 1 is a perspective view of a preferred embodiment of the invention shown in position in use;

FIG. 2 is an elevation view in section of the embodiment of FIG. 1;

FIG. 3 is a top view of the lower housing with the upper housing removed; and

FIG. 4 is a schematic illustration of the timer light circuit for the invention.

DETAILED DESCRIPTION OF A PREFERRED EMBODIMENT

Referring to the drawings, there is illustrated in FIG. 1, a contact printer in accordance with the invention designated generally by the numeral 10 and positioned on the corner of a photographic paper 12. The contact printer apparatus as best illustrated in FIG. 2, comprises a lower generally pyramid-shape stepped housing 14 having a generally rectangular shaped open base 16 and having front generally triangular wall 18, a rear generally triangular wall 20 and generally side walls 22 and 24 sloping upward to a small generally rectangular top or apex 26. The side walls 22 and 24 step in with steps 28 and 30 which together with an upper housing or cover 32 similarly having a generally pyramid shape forming a continuation of the lower portion of the inner housing to form a pair of chambers at each side for containing batteries and other components of the electrical circuit as will be described. The cover or upper housing is similarly pyramid in configuration having an open base for fitting over the lower housing and fitting within a peripheral depression of the lower housing 14.

The upper housing 32 includes front and back walls 34 and 36 and side walls 38 and 40 sloping up to a generally rectangular flat top 42. This top or upper housing 32 forms and cooperates with the internal or lower housing 14 to form chambers 44 and 46 within which are contained the batteries and other components of the circuit to be described.

The exposure window or opening 16 includes a peripheral frame 48 sized to slip over and grip the peripheral edges of the side walls of the lower housing around the opening 16. This generally rectangular peripheral frame includes inwardly extending horizontal flange portions 50 which overlap and retain a transparent cover 52 over the opening 16. This transparent cover 52 may be made of a clear transparent glass or plastic and includes beveled or tapered edges 54 shaped to force a print mask 56, which may be a negative or other suitable mask device, into direct contact with the photographic paper or medium 12. The peripheral flanges 50 of the retaining frame 48 overlap the edges of the photomask 56 and the peripheral edges of the transparent cover 52 and retain them in place. The peripheral frame 48 preferably includes a detent-like structure or lip 57 which snaps over a peripheral detent-like structure 58 in the form of a peripheral bead or strip of tape or the like around the edge of opening 16.

The printing device includes a light bulb or flash bulb 60 which is mounted in a bulb fixture 62 at the apex 26 of the inner or lower housing 14. The bulb fixture 62 is preferably detachably attached to the outside of the housing portion 26 and extends through an aperture therein.

A circuit for activating the flash bulb 60 preferably includes a circuit board 64 including a timing chip mounted on the inside of the top 42 of the cover and connected by means of conductors and contact strips mounted on the inside sidewall of the cover for engaging contacts 66 and 68 (FIG. 3) for connecting the fixture 62 to the circuit board 64 and into the circuit of FIG. 4. The batteries 74 and 76 are mounted in the lower housing and connected by leads 82 and 84 to contact buttons or rivets 86 and 88 which are engaged by contact strips 90 and 92 mounted on the inside surface of the cover 32 and connected by leads 94 and 96 to the circuit board 64. Thus, the batteries and the light are automatically removed from the circuit upon removal of the cover 34. This permits removal of the cover or upper housing 32 without effecting the circuit other than to deactivate it. When the top is placed back in position on the lower housing, contacts 66 and 68 engage (not shown) like contact strips 90 and 92 and contacts contacts 86 and 88 engage contact strips 90 and 92 and the circuit is again connected.

The upper housing or cover 32 is held in place on the lower housing by means of a pair of bolts or the like 98 and 100 extending through aligned bores 102 and 104 extending through both housings.

The circuit includes conductors connecting a push button switch 70 for activating or closing the circuit and a light emitting diode 72 for indicating the activation of the circuit. A plurality of batteries 74 and 76 are mounted within the housing to each side of the inner or lower housing within the chambers 44 and 46 and are connected by conductors to or within the flash circuit.

The printer of the present invention is designed for use within darkrooms and the like for adding identifying idicia information and the like to photoprints.

In operation, a proper negative or mask 56 having the desired information indicia or the like is selected and placed within frame 48 and over (i.e. outside) the transparent cover 52 and the frame 48 snapped into position over the open end 16 of the housing 14. The photoprinter is then placed in the desired position on a photographic paper or the like 12 as shown in FIG. 1, and the circuit activated for the desired duration to obtain the desired exposure.

The timing circuit is selected to provide a one-half second duration at one-half second intervals so long as the circuit is completed, i.e. switch 70 closed. With this circuit, the timing of the total flash is determined by counting the flashes of the LED 72 while holding the contact switch 70 in the depressed position. Thus, for a one second exposure, the switch is held for two flashes of the LED. For a two second exposure, the switch is held in contact for four flashes of the LED, etc.

This device or apparatus provides a compact, simple and inexpensive apparatus for contact printing on photosensitive paper, negatives and the like.

While I have illustrated and described my invention by means of specific embodiments, it is to be understood that numerous changes and modifications may be made therein without departing from the spirit and scope of the invention as defined in the appended claims.

I claim:

1. A contact printer for a photographic medium, said printer comprising:
   a housing defining an opaque enclosure having a generally rectangular end and an exposure window formed in and covering said entire end,
   an exposure light disposed in said housing spaced from said window,
   a timing circuit for timed activation of said light,
   a transparent cover for said exposure window,
   a printing mask for mounting in said window, and
   a quick detachable holder releaseably engaging said housing around the periphery of said window for detachably mounting said transparent cover and said printing mask in overlying relationship over said window.

2. The contact printer of claim 1 wherein:
   said housing comprises a lower housing and an upper housing,
   said lower housing having a generally pyramid configuration with said exposure window at the base of said housing, and
   said upper housing extending over the apex of said lower housing and defining a chamber therebetween.

3. The contact printer of claim 2 wherein said timing circuit is disposed in said chamber.

4. The contact printer of claim 3 wherein said transparent cover includes beveled peripheral edges for forcing the contact mask through the holder for contact with the surface of the photographic medium.

5. The contact printer of claim 4 wherein said timing circuit is operative to generate one-half second duration fashes at one-half second intervals when circuit is energized.

6. The contact printer of claim 5 wherein said timing circuit includes a timing chip and an indictor light mounted in said upper housing.

7. The contact printer of claim 6 wherein said timing circuit is deactivated upon removal of said upper housing.

8. The contact printer of claim 7 wherein:
   a first portion of said circuit is mounted on said lower housing, and
   a second portion of said circuit is mounted in said upper housing.

9. A contact printer for a photographic medium, said printer comprising:
   a housing defining an opaque enclosure having a generally rectangular end and an exposure window formed in said end,
   said housing comprises a lower housing and an upper housing,
   said lower housing having a generally pyramid configuration with said exposure window at the base of said housing.
   said upper housing detachably mounted on and extending over the apex of said lower housing and defining a chamber therebetween,
   an exposure light disposed in said upper housing spaced from said window,
   a timing circuit for timed activation of said light,
   a transparent cover for said exposure window,
   a printing mask for mounting in said window, and
   a quick detachable holder for detachably mounting said transparent cover and said printing mask in overlying relationship over said window.

10. The contact printer of claim 9 wherein said timing circuit is disposed in said chamber, with a first portion mounted on said lower housing and a second portion mounted on said upper housing and separable from said first portion for interrupting said circuit upon removal of said upper housing.

11. The contact printer of claim 10 wherein said transparent cover includes beveled peripheral edges for forcing the contact mask through the holder for contact with the surface of the photographic medium.

12. The contact printer of claim 11 wherein said timing circuit is operative to generate one-half second duration flashes at one-half second intervals when circuit is energized.

13. The contact printer of claim 12 wherein said circuit is deactivated upon removal of said upper housing.

14. The contact printer of claim 13 wherein said first portion and said second portion are connected together by separable contacts carried by said lower and said upper housing.

* * * * *